Patented Nov. 2, 1937

2,098,054

UNITED STATES PATENT OFFICE

2,098,054

BALL MILL ATTACK OF TITANIFEROUS ORES

Ford H. McBerty, Newark, Del., assignor, by mesne assignments, to E. I. du Pont de Nemours and Company, a corporation of Delaware Application November 23, 1935, Serial No. 51,247

5 Claims. (Cl. 75—115)

This invention relates to a process for sulfating titaniferous ores and more particularly to a process for the decomposition of ilmenite by means of sulfuric acid with good yields and in a continuous manner.

The invention consists specifically in acting with an acid upon a titaniferous material under conditions where the mixture of acid and ore is broken up into films, which films are then submitted to attrition. Such films are conveniently deposited upon solid bodies such as, for instance, iron balls. A two-fold effect is obtained in this manner: Any solid reaction product which would englobe the particles of unreacted ore is broken away with fresh surfaces of the ore continuously being exposed to the action of the acid, but what is more important, the inert bodies upon the surfaces of which the films are located act as heat stabilizing agents in that they disseminate the reaction heat and thereby prevent overheating. On the other hand, their heat initiates the reaction of the incoming fresh acid and ore.

The most convenient type of apparatus for carrying out my novel process is a ball mill, preferably of the tubular type which can be operated continuously in such a manner that acid and ore in reactive proportions are fed in at one end and the rotation of the ball mill is so regulated that the reaction product emerges at the other end as a solid disintegrated mixture of the sulfates of the constituents of the ore.

Figure 1:
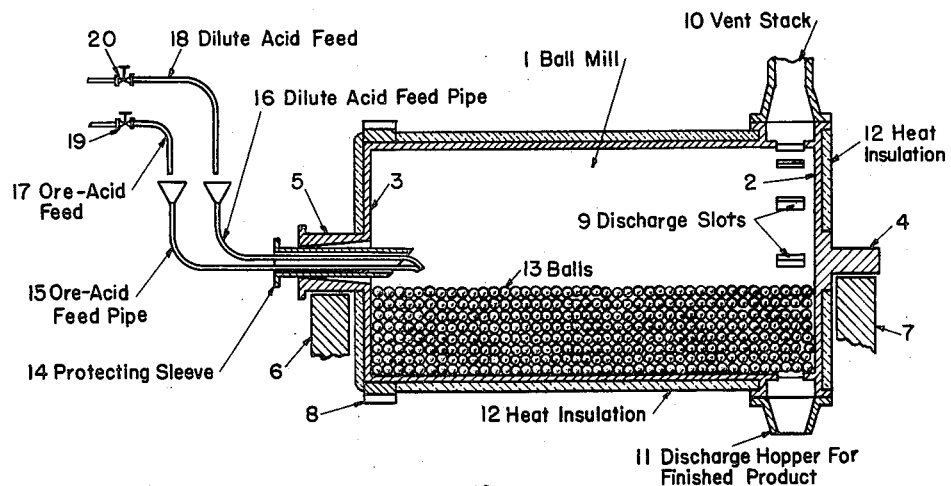
Figure 2:
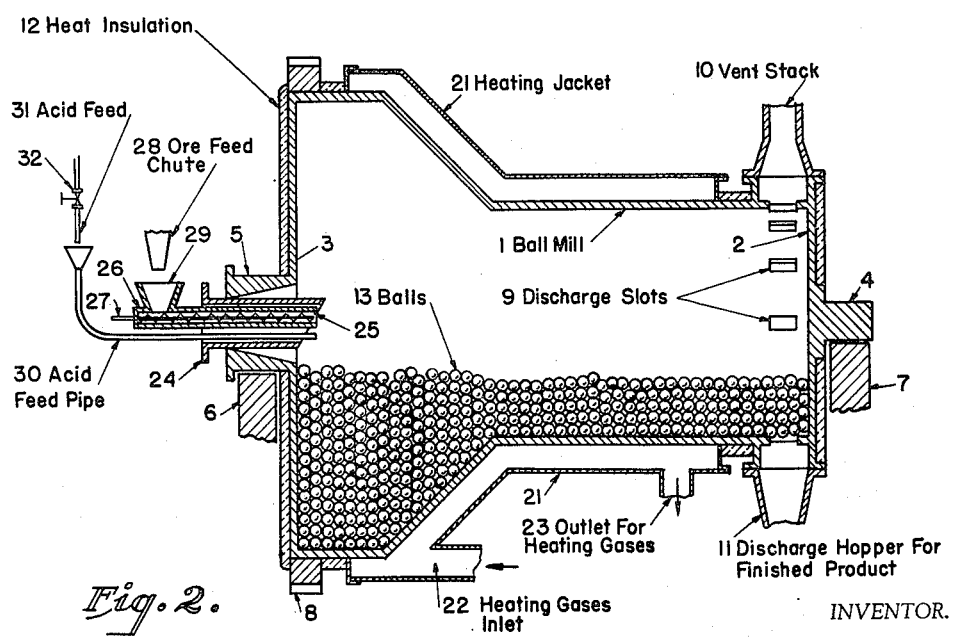

The appended Figures 1 and 2 represent ball mills equipped in a manner suitable for operating the present process.

In the prior art, the processes disclosed for the decomposition of titaniferous ores with sulfuric acid are concerned with the repetition of a batch process or in the repeated treatment of the titaniferous material in order to effect an economical decomposition of the ore into a form suitable for further processing as in the preparation of $TiO_2$ for pigment purposes. They are all characterized by the disadvantages of a batch process whereas a continuous process could be adapted by employing my novel invention. The disadvantages inherent in the batch operation are: high manual labor and supervision costs; non-uniformity of the product due to the uncontrolled nature of the reaction; and the intermittent supply of a product suitable for subsequent treatment.

While I employ the same materials, a titaniferous ore and sulfuric acid, the process hereinafter described is both novel and more economical than any process disclosed by the prior art.

I have mentioned titaniferous ores as a general class, but in the description of my novel process I shall refer specifically to ilmenite as it is both a convenient and available source of supply, but do not mean to infer thereby that my process is limited to this one material. My process can take a mixture of ilmenite and sulfuric acid or take them separately with subsequent mixing in the reaction apparatus and decomposes the ore with sulfuric acid into an excellent form for subsequent lixiviation and further treatment.

This decomposition, or as it shall be hereinafter called, "attack", is carried out with the following advantages: (1) intimate mixing throughout the reaction or attack period; (2) actual grinding with exposure of fresh reaction surfaces; (3) introduction of external heat into the reaction space, thus permitting the use of low acid concentrations; (4) delivery of product as a fine powder which is the best possible form for further processing; (5) utilization of the simplest possible type of equipment, giving minimum maintenance costs and simplicity of operation; (6) provision of large quantities of material at reaction temperatures with the accompanying stabilizing effect on minor variations in composition of feed; (7) the automatic nature of the process in that the materials to be decomposed are continuously fed to the reaction vessel and that the product is continuously delivered for further processing.

In the drawing—

Figure 1 shows a cross section of the ball mill that has been used for the attack of ilmenite with the hereinbefore mentioned process.

In this figure (1) represents the cylindrical shell of a ball mill having end plates (2) and (3), with trunnions (4) and (5) supported in bearings (6) and (7). The mill is driven at approximately 60% of critical speed by a suitable pinion meshing with ring gear (8). The cylindrical shell (1) of the mill is provided at one end with a number of slots (9) registering with discharge hopper (11) and vent stack (10). The shell (1) and the end plates (2) and (3) of the mill are covered with suitable heat insulation (12). The trunnion (5) is hollow and tapers internally towards the inside of the mill. It provides for the admission of protecting sleeve (14), through which are introduced ore pulp admission pipe (15) and acid admission pipe (16). The ore pulp is supplied through pipe (17) and may be regulated by means of valve (19), while the acid is introduced through pipe (18) and controlled by valve (20). The interior of the ball mill is filled with pebbles, or preferably steel balls (13), to the level of the opening through the trunnion (5). Slots (9) are too small to permit passage of these balls.

In Figure 2 is shown an alternative form of mill to permit the feeding of a dry ore and acid separately, and to permit supplying through the shell of the mill heat from an external source.

In Figure 2, (1) is the shell of the mill consisting of a short section of large diameter, a long section of small diameter, and a conical section joining the two. This shell is closed at the ends by end plates (2) and (3) carried on solid trunnion (4) and hollow trunnion (5), rotating respectively in bearings (7) and (6). Near the end of the small diameter cylindrical portion of the shell (1) are provided slots (9) registering with discharge hopper (11) and vent stack (10). The shell (1) is encircled by ring gear (8), through which the mill may be rotated at approximately 60% of critical speed. The ends (2) and (3) of the mill are covered by heat insulation (12) while the periphery of the shell is surrounded by jacket (21), into which hot gases can be introduced through inlet pipe (22) and vented through outlet pipe (23). Through the hollow trunnion (5) is introduced protecting sleeve (24). Through this protecting sleeve is introduced screw conveyor (25) enclosed in its housing (26). The screw conveyor may be driven through shaft (27) and fed with dry ore material from chute (28) through hopper (29). Also passing through protecting sleeve (24) is acid introduction pipe (30), through which acid from pipe (31) may be introduced into the interior of the mill at a rate controlled by valve (32).

The operation of the apparatus shown in Figure 1 is given below. While I have used this type of equipment, I do not intend to restrict my invention to this one particular design but rather to ball mills in general. The mill is first brought up to temperature by rotating empty for a suitable period, this only being necessary when the mill is to be started after stoppage. A mixture of oleum (104% $H_2SO_4$) and ground ilmenite ore is then fed through pipe (15) into the ball mill at a rate and quantity suitable to the size of mill to be used. Simultaneously a flow of weak acid or water is established through pipe (16) into the mill and it is so arranged to discharge at substantially the same point in the mill. The flow of the two materials is adjusted by experience in order to generate sufficient heat by the mixing of the oleum and the weak acid or water and taking into account the heat contained by the mill which was generated by its preliminary rotation to bring the added ingredients to a reacting temperature of approximately 200° C. and also to provide as the end product of the reaction a dry rather than sticky mass with consequently better grinding in the later stages of the mill. As the ilmenite and oleum are fed continuously into the mill, the initial reaction takes place on the surface of the balls and in the outer layers of the ilmenite particles. The resulting films of partially reacted mass are broken up by the grinding action and the powdered mass is gradually displaced towards the lower end of the mill. The slots at that end allow the material to sift out into the discharge hopper (11).

The operation of the equipment shown in Figure 2 is similar to that described hereinbefore except that dry ore may be introduced at a suitable rate by means of the feed screw and the mixing with acid of the required strength, temperature and quantity, takes place inside the mill. The enlarged feed end of the mill is expected to give a substantial capacity increase without proportionate power consumption, since it is at this end that it is advisable to have a deep mass of balls to eliminate the possibility of the partially reacted ingredients reaching the wall of the mill in sufficient quantity to harden with subsequent caking.

*Example #1*

The ball mill used for this run consisted of a steel shell, two feet in diameter by three feet long, supported on hollow trunnions and driven at 45 R. P. M. The feed end of the mill was raised one-half foot to promote the passage of the materials towards the discharge end. The mill was insulated with 85% magnesia about 1½" thick. Two ¾" pipes, one of which was lead-lined, were extended through one trunnion to a distance of 3" into the mill proper. At the other end of the mill, sixteen slots, 2" by ¾", were cut around the periphery to provide a means for discharging mass. This section of the mill was covered with an iron hood for fume disposal and underneath there was a chute for collecting the mass. The mill was charged with about 700 pounds of a mixture of 1" and 1¼" steel balls.

The mill was first heated up to 350° F. before any materials were added by revolving the clean mill containing the steel balls for four hours. The feed pipes were then put in place and the mixture of ore and oleum fed in continuously from an agitated tank at the rate of approximately 13 lbs. of ilmenite plus 17 lbs. of oleum per hour. The composition of the ore used was around 53% $TiO_2$ and the ratio of $TiO_2$ to iron in the original ore was approximately 1.59. The oleum used was 104% sulfuric acid.

Simultaneously with the ore-oleum feed, the addition of steam was started at such a rate as would presumably give a concentration of 85–90% acid during the decomposition of the ilmenite. The total weight of materials fed into the ball mill was 261 lbs., which represented continuous operation for nine hours. 215.5 pounds of satisfactory mass were discharged through the slots into the discharge hopper. A composite sample of this mass was analyzed and the results, when calculated as $TiO_2$, Fe, and $H_2SO_4$ in excess of that required to form Ti and Fe sulfates, were 18.15% $TiO_2$, 11.05% Fe and 14.4% $H_2SO_4$. Eighty-five per cent of the titanium in the ilmenite, when the ore to acid ratio was 1 to 1.33, was converted to the soluble form and was easily available for subsequent treatment.

No corrosion of the mill or the steel balls could be detected by inspection and no attempt was made to determine weight losses.

*Example #2*

This run was carried out in the same manner and in the same equipment as outlined under Example #1. The composition of the ore showed approximately 53% $TiO_2$ and 33.3% Fe in the form of both the ferrous and ferric oxides. The oleum used was 104% sulfuric acid and 1.33 times the weight of $TiO_2$ present in the ore was the oleum-$TiO_2$ ratio in the feed mixture. This mixture was fed continuously from the agitated tank at a rate of one-half pound per minute.

Simultaneously with the ore-oleum mixture, steam was admitted to the ball mill in order to initiate the reaction. Decomposition started almost immediately and the steam was shut off. The reaction was kept going by the addition of dilute acid recovered from the hydrolysis of a titanium sulfate solution, said acid containing 23-25% uncombined $H_2SO_4$ and 8 grams per liter of soluble titanium expressed as $TiO_2$. The rate of addition of the dilute acid was kept at 6.4 pounds per hour. With this dilution the average concentration of the acid available for decomposition in the ball mill was 82.4% $H_2SO_4$.

The system was allowed to run for a total time of eight and one-half hours. The total weight of the materials fed to the system (ore, oleum, steam, and weak acid) was 322 pounds. A composite sample of the mass was analyzed and the results when expressed as soluble $TiO_2$, as Fe, and $H_2SO_4$ in excess of that required to form soluble Ti, and ferric sulfates, were 18.90% $TiO_2$, 11.00% Fe, and 15.3% $H_2SO_4$. 88.5% of the titanium in the ilmenite was converted to the soluble form and was easily available for subsequent treatment.

There was no corrosion of the steel surfaces of the mill and the balls during this run. When the mill was opened for inspection, there was found to be no caking of the materials on the walls of the mill.

While I have disclosed, in the two examples hereinbefore described, the various conditions I have specifically employed, I do not mean to infer that my novel process is limited to this particular set of conditions.

As regards the nature of the titaniferous ore to be attacked, it can contain $TiO_2$ and iron oxides in varying amounts and more or less strongly held in combination. I can employ the coarse ilmenite sand, as it is naturally found, or the ground sand or the ground massive variety. I prefer the ground ilmenite, but with a longer ball mill, for instance, the coarse sand would be just as suitable. The sulfuric acid does not have to be of the fuming variety (i. e. more than 100% $H_2SO_4$) as the reaction could be initiated and continued by the application of external heat.

I am not limited to a premixed feed of ore and oleum in any definite composition. With a ratio of oleum to ore higher than 1.33, I could obtain a higher conversion of the insoluble $TiO_2$ to the soluble form. The same result could, of course, be obtained by allowing a longer time for passage through the mill.

My invention is not limited to the attack of ilmenite, but can also be used for the treatment of other titaniferous ores, such as, for instance, natural rutile, which are amenable to decomposition with sulfuric acid.

I claim:

1. In a process of attacking a titaniferous ore with acid, the steps of feeding sulfuric acid and ore into a reaction zone in which the mixture of acid and ore is broken up into films adhering to loose solid bodies, moving said bodies in said reaction zone in such a manner that they rub against each other, thereby submitting said films to attrition while, at the same time, said acid, ore and the reaction products obtained from the action of said acid upon said ore, move from the feed end of said reaction zone to its discharge end and adjusting the movement of said solid bodies, the temperature in said reaction zone, the amounts of said reactants and the concentration of said acid in such a manner that the reaction product is discharged as a solid product.

2. The process of claim 1 in which said reaction zone is constituted by a ball mill equipped with spheroidal solid bodies which are substantially unattacked by said reaction mixture.

3. The process of claim 1 in which strong sulfuric acid and ilmenite are continuously fed into one end of a ball mill comprising a cylindrical portion rotating on a substantially horizontal axis, said ball mill being equipped with iron balls, and discharging at the opposite end of said ball mill a solid, disintegrated reaction product comprising iron sulfate and titanium sulfate.

4. A continuous process for attacking a titaniferous ore comprising introducing said ore, together with regulated quantities of sulfuric acid, into a heated reaction zone in which a plurality of loose, solid bodies is contained, and about which the resultant mixture films, subjecting the filmed bodies to agitation to induce attrition of said films, and thereafter discharging the resultant product from said reaction zone in a substantially solid state.

5. A continuous process for attacking a titaniferous ore comprising introducing said ore in admixture with a regulated quantity of sulfuric acid into a rotary reaction zone, which is maintained under controlled temperature conditions, passing the ore-acid mixture in the form of films over a plurality of loose, solid bodies maintained within said reaction zone, thereupon subjecting said reaction zone to rotary movement to induce tumbling of said solid bodies and resultant attrition of their adhering films, and upon completion of the desired reaction between said ore and acid, discharging the resultant product in a substantially solid state from said reaction zone.

FORD H. McBERTY.